United States Patent [19]
Bleicher

[11] Patent Number: 4,970,378
[45] Date of Patent: Nov. 13, 1990

[54] GEARING FOR RESET TRIP ODOMETER
[75] Inventor: William L. Bleicher, Burton, Mich.
[73] Assignee: Delco Electronics Corporation, Kokomo, Ind.
[21] Appl. No.: 428,551
[22] Filed: Oct. 30, 1989
[51] Int. Cl.$^5$ ............................................. G01C 22/00
[52] U.S. Cl. ................................ 235/96; 235/131 JA; 235/139 R; 235/144 DM; 235/144 HC
[58] Field of Search ............... 235/95 R, 95 C, 96, 235/97, 130 R, 131 JA, 139 R, 144 DM, 144 M, 144 HC, 1 C

[56] References Cited
U.S. PATENT DOCUMENTS

| | | | |
|---|---|---|---|
| 1,798,916 | 3/1931 | Tittensor | 74/116 |
| 1,798,941 | 3/1931 | Helgeby | 235/131 FD |
| 1,919,493 | 7/1933 | Zubaty | 235/96 |
| 1,919,511 | 7/1933 | Helgeby | 235/144 S |
| 3,773,254 | 11/1973 | Malaviale | 235/144 DM |
| 3,856,195 | 12/1974 | Kakizaki et al. | 235/97 |
| 4,140,899 | 2/1979 | Borgstrom | 235/95 C |
| 4,300,117 | 11/1981 | Horii et al. | 340/52 D |

Primary Examiner—Benjamin R. Fuller
Attorney, Agent, or Firm—R. L. Phillips

[57] ABSTRACT

Geared drive for reset trip odometer in which a transfer tooth on each of the rotatable odometer wheels is immediately ahead of the tooth space in the circular track on the wheels for tracking the wide teeth of the associated transfer pinion gear and laterally clear of the narrow pinion teeth. With the wide teeth normally riding on the track of the wheel, there is a gear locking action if a reverse drive occurs to limit wheel droop from a reference line and anti-locking action when reset is attempted so that the wheels can be forwardly driven to record trip distances.

4 Claims, 2 Drawing Sheets

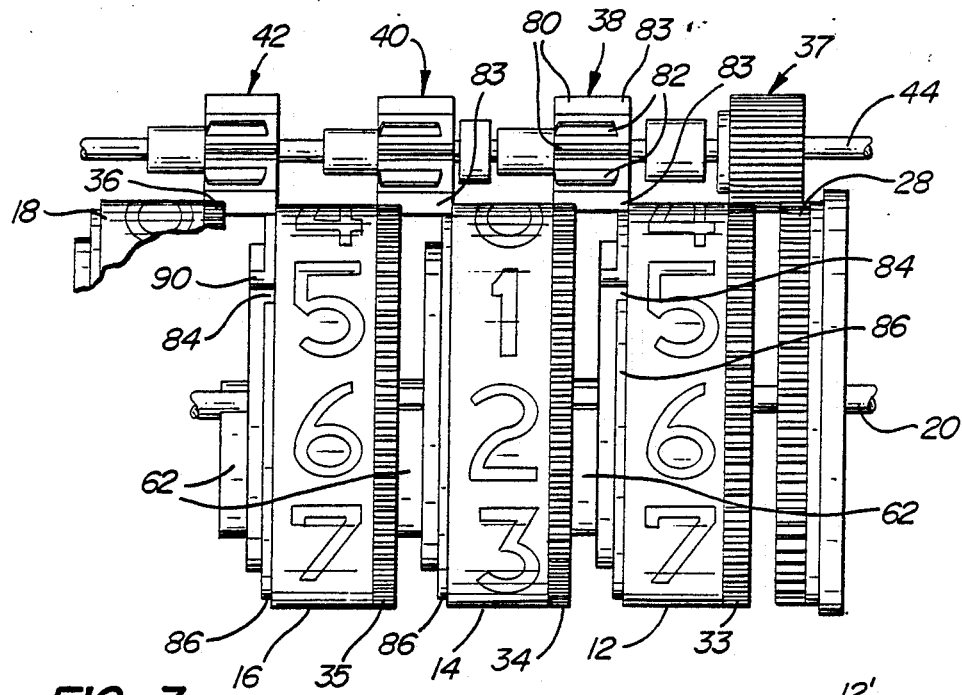
FIG. 3
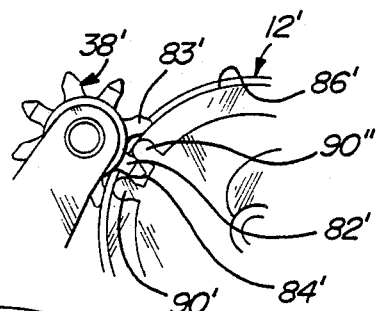
FIG. 5
PRIOR ART
FIG. 4
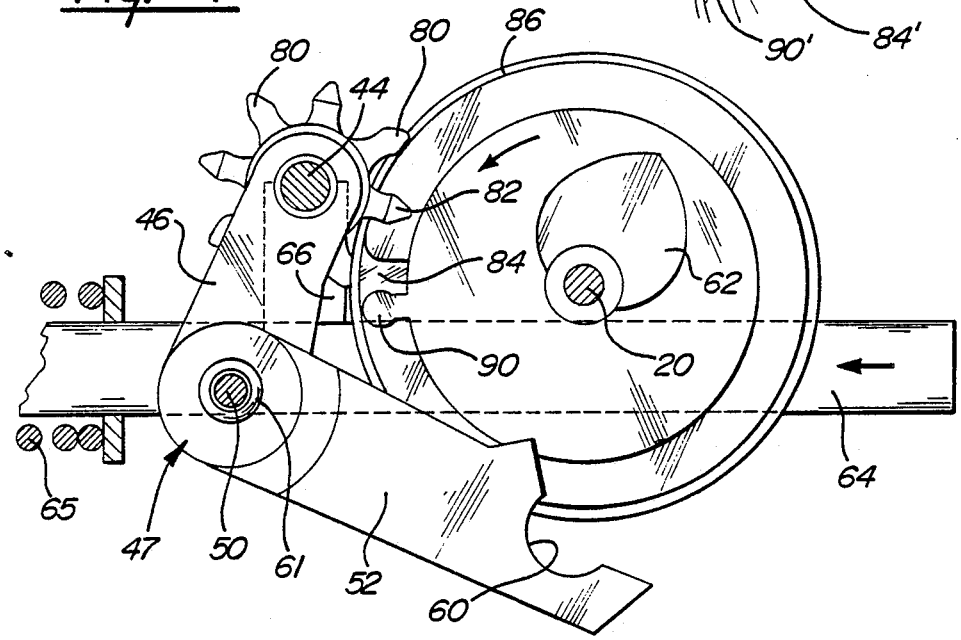

GEARING FOR RESET TRIP ODOMETER

BRIEF DESCRIPTION OF THE INVENTION

This invention relates to vehicle odometers and more particularly to new and improved trip odometer gearing interconnecting the odometer input drive with the odometer numeral wheels which locks in one direction of wheel rotation to minimize odometer wheel droop and which is anti-locking in the opposite direction to prevent wheel lock-up after reset to allow travel distances to be registered.

BACKGROUND OF THE INVENTION

Prior to the present invention, odometers have been utilized with vehicles to register distances traveled. Such odometers have various reset devices which allow the operator to reset the odometer to a start position at the completion of a trip so that a following trip distance can be registered. In some of these prior devices, a lock-up condition between the odometer wheels and the selectively releasable odometer wheel transfer gearing can occur if the reset device is released before full stroke for reset and the transfer gear assembly returns to a gear engaging position. When the transfer and odometer gearing become interlocked, the odometer wheels cannot turn to register travel distance.

Such interlocking can be cleared by fully stroking the reset device to move the transfer gearing away from the odometer wheel gearing while turning the odometer wheels so that they all register zero with respect to a reference line, usually the display window in the vehicle instrument panel. In this position, the transfer gearing is in proper alignment with the odometer wheel gearing which are brought into operative mesh by a return spring when the operator releases the reset device. While this provides a correction, interlocking may again occur with another incomplete stroke of the reset device and with certain rotary positions of the odometer wheels.

In addition to lock up of the gearing in the odometer, odometer wheel droop may occur after proper reset to the zero position. This results from lash in the gearing, and any number or all of the wheels may turn a limited amount in one direction so that the zero numerals are not properly aligned, and may turn below the level of the display window so that other numerals are visible.

To eliminate reset lock-up and to allow the accurate recording of trip distances, the present invention incorporates a new and improved gear arrangement which effectively transmits the drive between the transfer gears and odometer wheels and which allows the reset to be fully or partially accomplished with consistent return of the transfer gear into drive gear arrangements without lock-up. This arrangement allows the gears to transmit the drive even when reset was not fully completed and optimizes accurate registration of distances traveled.

To prevent odometer wheel droop, this invention provides effective lock up between the transfer gearing and the gearing and wide tooth tracks on the odometer wheels so that the wheels cannot significantly droop by rotating in one direction and will maintain alignment in the viewing window.

It is, therefore, a feature, object and advantage of this invention to provide a new and improved reset trip odometer wherein lock-up is always prevented in the forward direction.

It is another feature, object and advantage of this invention to provide a new and improved reset trip odometer wherein wheel droop is minimized in the display window.

It is another feature, object and advantage of this invention to provide a new and improved reset trip odometer wherein the subtraction of distance is minimized should the input drive be reversed.

It is another feature, object and advantage of this invention to provide a new and improved selectively releasable drive gear arrangement in a trip odometer which prevents transfer gear lock up as a result of odometer reset action so that the odometer wheels will always turn to accumulate units of measured distance.

It is another feature, object and advantage of this invention to provide a new and improved gear drive system for an odometer that advantageously utilizes the gearing to positively limit the odometer wheel rotation in a first direction relative to a start up reference line after a reset so that the numbers thereon remain substantially in line and are ready to rotate in an opposite direction to record distances traveled by a vehicle.

It is another feature, object and advantage of this invention to provide a new and improved reset trip odometer with selectively releasable drive gearing drivingly connecting the odometer input to the odometer wheels which minimizes wheel rotation in a direction that would reduce accumulated units of measured distance.

These and other features, objects and advantages of this invention will be more apparent from the following detailed description and drawings in which:

BRIEF DESCRIPTION OF THE DRAWINGS

FIG. 3 is an elevational view of a portion of the trip odometer of FIG. 1 with parts removed;

FIG. 4 is a side view of a portion of the trip odometer of FIG. 1 with parts removed; and FIG. 5 is a fragmentary side view of a prior art odometer with the transfer gearing and odometer wheel in a locked-up condition.

DETAILED DESCRIPTION OF THE DRAWINGS

Figure 1:
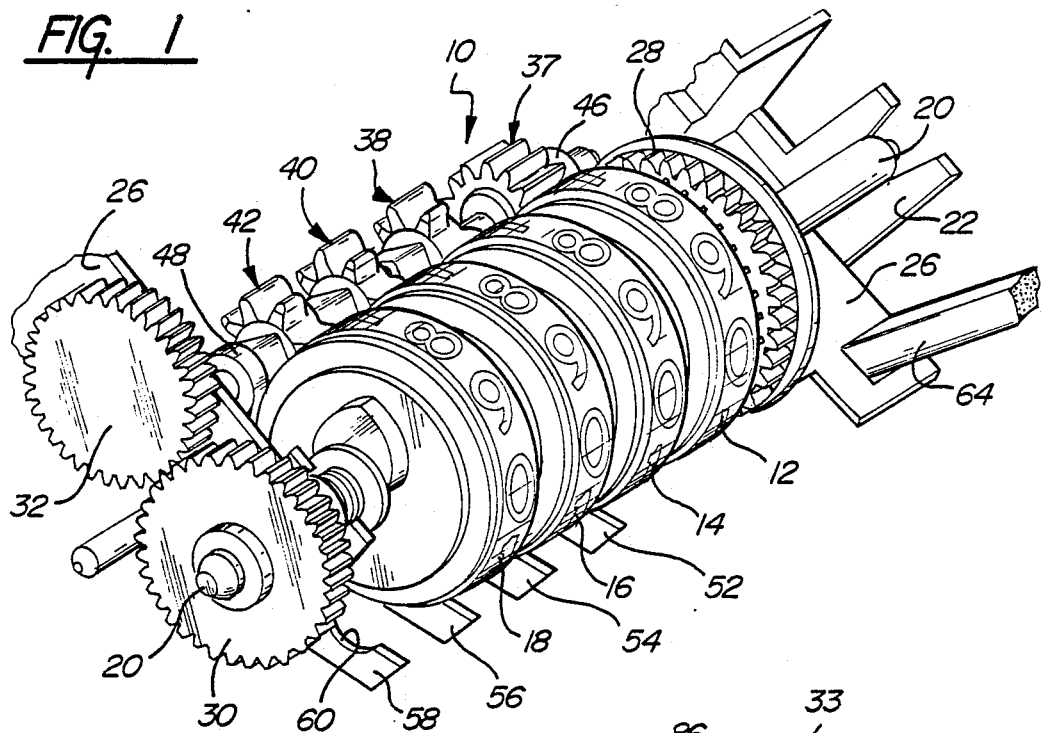
FIG. 1 is a pictorial view of a portion of a trip odometer for an automotive vehicle.
Figure 2:
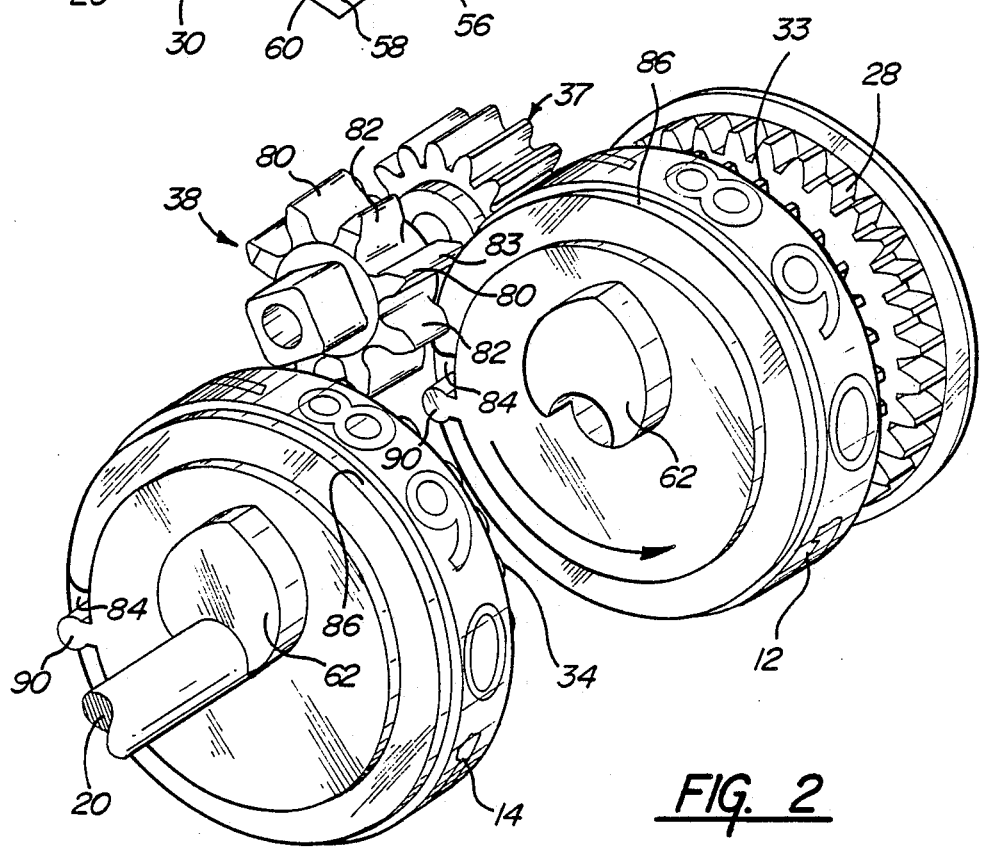
FIG. 2 is an exploded view of a portion of the trip odometer of FIG. 1.

Turning now to FIG. 1 there is shown a reset trip odometer 10 for a vehicle, not shown, having a plurality of conventionally numbered odometer wheels 12, 14, 16 and 18 mounted for rotation on a drive shaft 20 supported by laterally spaced forks 22, 24 of a support bracket 26. Mounted fast to the drive shaft 20 to the sides of odometer wheels 12 and 18, respectively, are inboard spur gear 28 and outboard spur gear 30. Spur gear 30 meshes with and is rotatably driven by an input spur gear 32 which is rotatably driven by a stepper motor energized by signals generated by the vehicle power transmission output and a sender associated therewith, which are not shown. Spur gear 30 rotatably drives shaft 20 and thereby rotates the inboard spur gear 28. Drivingly interconnecting the spur gear 28 to the annular gears 33, 34, 35 and 36 formed in the inboard peripheral edges of each of the odometer wheels is a gang of four laterally spaced transfer pinion gears 37, 38, 40 and 42 that respectively mesh with gears 33, 34, 35 and 36. These transfer pinion gears are mounted for rotation on an elongated shaft 44 which is secured to the ends of laterally spaced arms 46 and 48 of an odometer pinion carrier 47 that is pivotably mounted to the bracket 26 by a pivot shaft 50. In addition to arms 46, 48 extending from the pivot 50 to one side of the odometer wheels for support of the pinion shaft 44 and pinion gears, the pinion carrier has four laterally spaced reset arms 52, 54, 56 and 58 extending to the other side of the odometer wheels, each of which has a profile cam actuator surface 60 adjacent to the free end thereof for engaging respective heart shaped cams 62 fixed to the side of each odometer wheel and, where required, turning the odometer wheels back to their zero or start positions aligned and centered in a window in the vehicle instrument panel, not shown, so that they are ready to record distances from the start of another vehicle trip A torsion spring 61 biases arms 46 so that the pinion gears engage the odometer gearing and the reset arms are away from the reset cams 62. Compression spring assembly 63 mounted on shaft 20 between bracket 26 and odometer wheel 18 urges the wheels in an inboard direction to keep the gears in mesh.

Reset is accomplished by manually depressing a reset stem 64 against the force of spring 65 which moves an attached fork 66 linearly in the direction that the stem is stroked. The inboard end of pinion shaft 44 is trapped by the fork 66 so that arms 46, 48 are turned counterclockwise in particular reference to FIG. 4 and the gang of transfer pinion gears 37, 38, 40 and 42 are simultaneously swung from engagement with the odometer wheel spur gears 33, 34, 35 and 36. As this pinion gear disengagement takes place, the cam surfaces 60 of the cam arms engage the cams 62 to reset the associated odometer wheel by turning them on shaft 20 where necessary backward or forward to the zero position.

Transfer pinion gear 37 meshes with pinion gear 28 on shaft 20 and the adjacent gear 33 on odometer wheel 38 and transmits the rotary drive from spur gear 28 to the first odometer wheel 12. The pinion gears 38, 40, 42 which drivingly interconnect the odometer wheels are substantially identical in structure and each has wide pinion teeth 80 that extend across the entire width of the body of the gear which alternate with narrow pinion teeth 82 that extend from one edge in an inboard direction to terminate short of the opposite edge.

As shown best in FIG. 3, the inboard edges 83 of the wide teeth are adapted to ride on a circular rim or wide tooth track 86 on an associated odometer wheel which is interrupted only by a radially and inwardly extending recess or tooth space 84 formed between two adjacent end portions of the rim 86. The tooth space also extends laterally only for the width of the rim 86 to receive only the inboard edges 83 of the wide teeth of the pinion gears under certain operating conditions as will be described. Importantly, the tooth space 84 is clear of the short teeth of the pinion gear. In addition to the rim 86, each of the odometer wheels 12, 14, 16 have a transfer tooth 90 which extends in a lateral direction therefrom as best shown in FIG. 3. This transfer tooth 90 is adapted to rotate with the odometer wheel and turn under the wide tooth 80 of the associated pinion gear and then contact the inboard edge of the narrow tooth 82 of the pinion gear to turn the pinion gear so that the wide tooth riding on rim 86 enters tooth space 84 to thereby turn the next adjacent odometer wheel constantly meshing with this pinion through an arc equal to one numeral. This long tooth then turns out of the tooth space while the following short tooth enters the space between the odometer wheels clear of the transfer tooth and the next following wide tooth engages the track or rim 86 until this indexing action is repeated on the next complete rotation of the odometer wheel.

Assuming that the odometer wheels are reset so that the numeral zero is displayed on each wheel in the window of the vehicle instrument panel and a trip is started, the gear 28 turns to rotate the pinion gear 37, which in turn drives the odometer wheel 12. One of the wide teeth of pinion 37 rides on the rim 86 of the odometer wheel 12, the transfer tooth 90 on the turning odometer wheel rides underneath this tooth and engages the edge of the narrow tooth extending radially inward between wheels 12 and 14 to turn the pinion gear 38 so that the following wide tooth turns down into the tooth space 84 and, accordingly, turns the next adjacent odometer wheel 14 1/10th of a turn. On continued rotation of wheel 12, the engaged wide tooth leaves the tooth space 84 and the narrow tooth of the pinion enters into the space between the adjacent odometer wheels and the next wide tooth 80 engages the rim 86 of the odometer wheel 12. The odometer wheel 14 stops as the pinion gear 38 can no longer turn until the transfer tooth 90 again strikes the down narrow tooth 82 to repeat an indexing of wheel 14 through an arc so that the next numeral is displayed. This action continues and the rotary indexing takes place through each wheel until the numerals 9999 are displayed unless previously reset.

FIG. 4 illustrates odometer wheel rotation after the reset stem has been depressed and the pinion gears have been returned to an operating position. The odometer wheel has slightly rotated counterclockwise to show that the narrow tooth 82 on the pinion gear 38 is not trapped in tooth space 84. If tooth 82 were so caught, the odometer wheel 12 could not turn because the wide tooth 80 bears against track 86. Such a lock-up condition is shown in the prior art construction of FIG. 5 in which narrow pinion tooth 82' is within the tooth space 84' between two laterally extending transfer teeth 90' and 90''. This wheel 12' cannot rotate counterclockwise to the wheel position of FIG. 4 because it is locked up since the wide tooth 83' of the pinion gear 38' contacts the rim 86'. Accordingly, this and the rest of the odometer wheels cannot rotate to measure distances traveled.

If the prior art odometer wheel of FIG. 5 were accurately reset to zero, the wide teeth 80' would be riding on the rim 86', the short pinion would be behind the front transfer tooth 90'', and the numeral in the instrument panel would indicate zero. Because of lash in the gearing system, the odometer wheel can droop so that the zero falls from the viewing window. As the wheel droops and turns clockwise, no lock-up can occur in the gearing to limit odometer wheel rotation, as the odometer simply runs backward and may continue to do so if the polarity of the stepper motor becomes reversed. In contrast, in applicant's invention odometer wheel droop is reduced since lock-up would occur in a clockwise direction since the single transfer tooth 90 will turn counterclockwise to hit the short tooth between the odometer wheels and the long tooth will contact the track to effect the desired lock-up to prevent further reverse operation.

A preferred embodiment has been shown and described to set forth the principles of this invention and variations that will be now apparent to those skilled in the art can be made without departing from the spirit and scope of this invention as set forth in the following claims.

The embodiments of the invention in which an exclusive property or privilege is claimed are defined as follows:

1. A reset trip odometer having at least a pair of odometer wheels laterally arranged with a space therebetween and operatively mounted for rotation in a first direction on a shaft extending through said wheels;
   gear means for rotatably driving a first of said odometer wheels;
   odometer wheel gear means associated with a second of said odometer wheels,
   transfer gear means for drivingly interconnecting said first and second odometer wheels,
   means supporting said transfer gear means for movement between a first position in which said transfer gear is in operative engagement with said odometer wheels and a second position in which said transfer gear means is displaced from operative engagement with said odometer wheels for resetting the odometer wheels,
   said transfer gear means having a plurality of arcuately spaced and alternating wide and narrow tooth means thereon,
   annular track means on said first of said odometer wheels in sliding contact with a contact face portion of any of said wide tooth means of said transfer gear means,
   tooth space means within said annular track means laterally offset with respect to all of said narrow tooth means for receiving an end portion of any of said wide tooth means, and
   transfer tooth means rotationally ahead of said tooth space means and offset from said track for engaging a face portion of said narrow tooth means so that said transfer gear means rotates to turn the second odometer wheel in the first direction until said wide tooth moves from said tooth space and one of said narrow tooth means enters the space between the first and second odometer wheels and one of the wide tooth means engages said track means.

2. The odometer of claim 1 wherein said tooth space means is laterally offset from any of said narrow tooth means so that said narrow tooth means clear said tooth space means in any rotational position of said first odometer wheel or said transfer gear means to eliminate gear locking when said transfer gear means is returned from said second position to said first position.

3. The odometer of claim 1 wherein said transfer tooth means is a unitary member extending laterally outwardly from said track to contact one of said tooth means of said transfer gear means when said odometer wheel begins turning in a direction opposite to said first direction to turn said transfer gear and cause said transfer gear to lock said first odometer wheel with one of said wide tooth means engaging said track.

4. A trip odometer for an automotive vehicle comprising a plurality of odometer wheels having numerals thereon for indicating distances of vehicle travel,
   rotatable input gear means for rotary driving said odometer wheels,
   gear means affixed to each of said odometer wheels,
   transfer pinion gear assembly means for drivingly interconnecting said input gear means to said odometer wheels so that said odometer wheels can register the rotation of said input gear means, said pinion gear assembly means including:
   a main transfer pinion operatively meshing with said input gear means and with the gear means of a first of said odometer wheels so that the first of said odometer wheels is driven by input gear means,
   said transfer gear assembly further including a second transfer gear pinion having arcuately spaced pinion peripherally encompassing teeth, said pinion teeth having alternating wide and narrow face widths, a first of said odometer wheels having a track which extends in a circular path from a forward end portion to a terminal end portion, said terminal end portion being adjacent to said forward end portion to define a tooth space for said wide face teeth and for clearing said narrow face teeth, and
   a single transfer tooth extending laterally from said track for engaging said narrow face tooth for locking said pinion and said first wheel when rotation is attempted in one direction and for engaging said narrow face tooth for turning said pinion so that one of said wide face teeth enters said tooth space to thereby turn a second odometer wheel in an opposite direction along with said first odometer wheel.

* * * * *